US010316118B2

(12) United States Patent
Bao et al.

(10) Patent No.: US 10,316,118 B2
(45) Date of Patent: *Jun. 11, 2019

(54) MONOMER SELECTION TO PREPARE ULTRA HIGH MOLECULAR WEIGHT DRAG REDUCER POLYMER

(71) Applicant: LIQUIDPOWER SPECIALTY PRODUCTS, INC., Houston, TX (US)

(72) Inventors: Zhiyi Bao, Ponca City, OK (US); Stuart M. Milligan, Ponca city, OK (US); Michael Olechnowicz, Ponca City, OK (US)

(73) Assignee: LIQUIDPOWER SPECIALTY PRODUCTS INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,821

(22) Filed: Jun. 13, 2017

(65) Prior Publication Data

US 2018/0030168 A1 Feb. 1, 2018

Related U.S. Application Data

(63) Continuation of application No. 13/208,951, filed on Aug. 12, 2011, now Pat. No. 9,676,878.

(51) Int. Cl.
*C08F 20/10* (2006.01)
*F17D 1/16* (2006.01)
*C08F 20/18* (2006.01)
*C08F 220/18* (2006.01)

(52) U.S. Cl.
CPC .............. *C08F 20/10* (2013.01); *C08F 20/18* (2013.01); *C08F 220/18* (2013.01); *F17D 1/16* (2013.01); *Y10T 137/0391* (2015.04)

(58) Field of Classification Search
CPC ........ C08F 20/10; C08F 20/18; C08F 220/18; F17D 1/16; Y10T 137/0391
USPC ........................................................ 526/328
See application file for complete search history.

(56) References Cited

U.S. PATENT DOCUMENTS

| | | |
|---|---|---|
| 3,493,000 A | 2/1970 | Canevari et al. |
| 3,554,897 A * | 1/1971 | Stanley et al. ............ C10G 7/10 208/48 AA |
| 3,654,994 A | 4/1972 | Slagel et al. |
| 3,661,541 A | 5/1972 | Hollyday, Jr. |
| 3,679,582 A | 7/1972 | Wagenaar et al. |
| 3,726,653 A | 4/1973 | Van der Meij et al. |
| 3,736,288 A | 5/1973 | Stratta et al. |
| 3,748,266 A | 7/1973 | Malone et al. |
| 3,758,406 A | 9/1973 | Malone et al. |
| 3,857,402 A | 12/1974 | Schuh |
| 3,865,124 A | 2/1975 | Kohler et al. |
| 4,068,676 A | 1/1978 | Thorn et al. |
| 4,190,069 A | 2/1980 | Krantz |
| 4,212,312 A | 7/1980 | Titus |
| 4,358,572 A | 11/1982 | Mack et al. |
| 4,527,581 A | 7/1985 | Motier |
| 4,573,488 A | 3/1986 | Carville et al. |
| 4,736,005 A | 4/1988 | Castner |
| 4,769,160 A | 9/1988 | Karydas |
| 4,876,018 A | 10/1989 | Karydas |
| 4,881,566 A | 11/1989 | Ubels et al. |
| 4,983,186 A | 1/1991 | Naiman et al. |
| 4,997,580 A | 3/1991 | Karydas et al. |
| 5,021,526 A | 6/1991 | Ball |
| 5,039,432 A | 8/1991 | Ritter et al. |
| 5,080,121 A | 1/1992 | Malik et al. |
| 5,110,874 A | 5/1992 | Naiman et al. |
| 5,159,035 A | 10/1992 | Evani |
| 5,244,937 A | 9/1993 | Lee et al. |
| 5,269,909 A | 12/1993 | Ovalles et al. |
| 5,374,350 A | 12/1994 | Heck et al. |
| 5,504,132 A | 4/1996 | Smith et al. |
| 5,539,044 A | 7/1996 | Dindi et al. |
| 5,980,730 A | 11/1999 | Morel et al. |
| 6,007,702 A | 12/1999 | Schievelbein |

(Continued)

FOREIGN PATENT DOCUMENTS

| | | |
|---|---|---|
| EP | 0 555 054 A1 | 8/1993 |
| EP | 0 882 739 A2 | 12/1998 |

(Continued)

OTHER PUBLICATIONS

Eslami et al. "Emulsion Atom Transfer Radical Block Copolymerization of 2-Ethylhexyl Methacrylate and Methyl Methacrylate", Journal of Polymer Science PartA: Polymer Chemistry, vol. 44, issue 6, p. 1914-1925 (2006).
A. Saniere et al., "Pipeline Transporation of Heavy Oils, a Strategic, Economic and Technological Challenge", Oil & Gas Science and Technology, Rev. IFP, vol. 59 (2004), No. 5, pp. 455-466.
H. Marawan, "Pipeline Drag Reducers", (2004).
Abarasi Hart, "A Review of Technologies for Transporting Heavy Crude Oil and Bitumen via Pipelines", J. Petrol Explor Prod Technol (2014), 4:327-336.
D.A. Storm, "Drag Reduction in Heaving Oil", Journal of Energy Resources Technology, Sep. 1999, vol. 121, p. 145-148.
Qun Chen et al, "Optimization Principle for Variable Viscosity Fluid Flow and Its Application to Heavy Oil Flow Drag Reduction", Energy Fuels 2009, vol. 23, pp. 4470-4478.
Marlin D. Holtmyer et al., "Study of Oil Soluble Polymers as Drag Reducers", Polymer Engineering and Science, Mid-May 1980, vol. 20, No. 7, p. 473-477.

(Continued)

*Primary Examiner* — Michael Bernshteyn
(74) *Attorney, Agent, or Firm* — Patterson & Sheridan, LLP

(57) ABSTRACT

The process begins by obtaining a first batch of monomers selected from a group of acrylates with a molecular weight equal to or less than butyl acrylate and/or methacrylate with a molecular weight equal to or less than butyl methacrylate. A second batch of monomers is then selected from a group of acrylates with a molecular weight greater than butyl acrylate and/or methacrylate with a molecular weight greater than butyl methacrylate. A mixture is then prepared by mixing the first batch of monomers and the second batch of monomers, wherein the second batch of monomers are greater than 50% by weight of the mixture. Finally, the mixture is polymerized to produce an ultra high molecular weight polymer.

20 Claims, 2 Drawing Sheets

(56) References Cited

U.S. PATENT DOCUMENTS

| | | | |
|---|---|---|---|
| 6,015,779 | A | 1/2000 | Eaton et al. |
| 6,178,980 | B1 | 1/2001 | Storm |
| 6,218,490 | B1 | 4/2001 | Brunelli et al. |
| 6,524,469 | B1 | 2/2003 | Schucker |
| 6,576,732 | B1 | 6/2003 | Milligan et al. |
| 7,361,628 | B2 | 4/2008 | Milligan et al. |
| 7,468,402 | B2 | 12/2008 | Yang et al. |
| 8,022,118 | B2 | 9/2011 | Milligan et al. |
| 9,678,878 | B2 * | 6/2017 | Wilkerson ............ G06F 1/3243 |
| 9,784,414 | B2 * | 10/2017 | Bao .......................... C09K 3/00 |
| 2006/0035793 | A1 | 2/2006 | Goldman |
| 2006/0148928 | A1 | 7/2006 | Harris et al. |
| 2010/0069573 | A1 | 3/2010 | Arriola et al. |
| 2010/0297734 | A1 | 11/2010 | McCluskey et al. |

FOREIGN PATENT DOCUMENTS

| | | |
|---|---|---|
| EP | 882739 A2 * | 12/1998 |
| GB | 1 437 132 A | 5/1976 |
| JP | 2000-246779 A | 9/2000 |
| WO | 99/57162 A1 | 11/1999 |
| WO | 2009/046520 A1 | 4/2009 |

OTHER PUBLICATIONS

Yuxin Ma et al., "Synthesis of Poly(dodecyl methacrylate)s and Their Drag-Reducing Properties", Journal of Applied Science, vol. 88, p. 1622-1626, (2003).

David E. Farley, "Drag Reduction in Nonaqueous Solutions: Structure-Property Correlations for Poly(Isodecyl Methacrylate)", American Institute of Mining, Metallurgical and Petroleum Engineers, Inc., Paper No. SPE 5308, Society of Petroleum Engineersof Aime, Dallas, TX, p. 147-160.

A. Saniere et al., "Pipeline Transportation of Heavy Oils, a Strategic, Economic and Technological Challenge", Oil & Gas Science and Technology, vol. 59 (2004), No. 5, pp. 455-466.

Rafael Martinez-Palou et al., "Transportation of Heaving and Extra-Heavy Crude Oil by Pipeline: A Review", Journal of Petroleum Science and Engineering, 75 (2011), pp. 274-282.

O. Strausz and E Lown, "The Chemistry of Alberta Oil Sands, Bitumens and Heavy Oils", Albert Energy Research Institute (2003), pp. 464-480.

A.F.M. Barton ph.D., "CRC Handbook of Solubility Parameters and Other Cohesion Parameters", CRC Press Inc., 2nd Ed. (1991).

John Burke, "Solubility Parameters: Theory and Application", The Book and Paper Group Annual, vol. 3 (1984), The American Institute for Conservation, pp. 1-35.

Hyoung J. Choi et al., "Polymer-Induced Turbulent Drag Reduction", Ind. Eng. Chem. Res. 1996, 35, pp. 2993-2998.

M.B. Dusseault, "Comparing Venezuelan and Canadian Heaving Oil and Tar Sands", Canadian International Petroleum Conference, Paper 2001-061, (2001), pp. 1-20.

R.F. Fedors, "A Method for Estimating Both the Solubility Parameters and Molar Volumes of Liquids", Polymer Eng. & Sci., vol. 14, No. 2, (Feb. 1974).

A.R. Martinez, "Report of Working Group on Definitions", International Centre for Heavy Hydrocarbons—Definition of Bitumen Report, available at http: ww.oildrop.org (downloaded Aug. 29, 2006), p. 1 of 4.

J.F. Schabron et al., "Petroleum Residua Solubility Parameter/ Polarity Map: Stability Studies of Residua Pyrolysis", Final Report WRI-99-R004, Western Research Institute, Laramie, WY (Apr. 1999).

Petroleum Technology Transfer Council, Understanding Paraffin and Asphaltene Problems in Oil and Gas Wells (2003).

J. Brandrup et al., "Polymer Handbook", 4th Ed., vol. 2, John Wiley & Sons, Inc., (1999).

Research Institute of Petroleum Industry, "Asphaltene Deposition", (2000-2006).

E. Rogel, "Theoretical Estimation of the Solubility Parameter Distributions of Asphaltenes, Resins, and Oils from Crude Oils and Related Materials", Energy & Fuels, 1997, 11, pp. 920-925.

J. Wang, "Asphaltene: A General Introduction" (2000).

Jacques L. Zakin and Donald L. Hunston, "Effect of Polymer Molecular Variables on Drag Reduction", J. Macromol. Sci.-Phys., B18(4), 795-814 (1980).

CDR Flow Improver Applications Manual, Conoco Specialty Products Inc., pp. 1-52.

CDR Flow Improver, Conoco Specialty Products Inc., pp. 1-12.

*Lubrizol Specialty Products, Inc. v. Baker Hughes Incorporated, Baker Petrolite Corporation, and Baker Petrolite LLC*, Civil Action No. 4:15-cv-02915, Baker Hughes's Disclosures Pursuant to Local P.R. 3-3 ("Invalidity Contentions"), Jun. 22, 2016,pp. 1-51.

*Lubrizol Specialty Products, Inc. v. Baker Hughes Incorporated, Baker Petrolite Corporation, and Baker Petrolite LLC*, Civil Action No. 4:15-cv-02915, Exhibit A-1, Identification of Asserted Claims and Limitations Therein, U.S. Pat. No. 8,022,118,Jun. 22, 2016, pp. 1-2.

*Lubrizol Specialty Products, Inc. v. Baker Hughes Incorporated, Baker Petrolite Corporation, and Petrolite LLC*, Civil Action No. 4:15-cv-02915, Exhibit A-3 Burger, Jun. 22, 2016, pp. 1-17.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Carville, Jun. 22, 2016, pp. 1-12.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Eaton, Jun. 22, 2016, pp. 1-15.

*Lubrizol Specialty Products, Inc. v. Baker Hughes Incorporated, Baker Petrolite Corporation, and Baker Petrolite LLC*, Civil Action No. 4:15-cv-02915, Exhibit A-3 El-Gamal, Jun. 22, 2016, pp. 1-15.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Holmyer, Jun. 22, 2016, pp. 1-14.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Inaoka, Jun. 22, 2016, pp. 1-15.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Kowalik, Jun. 22, 2016, pp. 1-11.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Malik '121, Jun. 22, 2016, pp. 1-9.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Malone, Jun. 22, 2016, pp. 1-15.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Motier, Jun. 22, 2016, pp. 1-15.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Naiman, Jun. 22, 2016, pp. 1-11.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Schmerwitz, Jun. 22, 2016, pp. 1-11.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Shen, Jun. 22, 2016, pp. 1-11.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Smith, Jun. 22, 2016, pp. 1-16.

*Lubrizol Specialty Products, Inc. v. Baker Hughes Incorporated, Baker Petrolite Corporation, and Baker Petrolite LLC*, Civil Action No. 4:15-cv-02915, Exhibit A-3 Weitzen, Jun. 22, 2016, pp. 1-13.

*Lubrizol Specialty Products, Inc. v. Baker Hughes Incorporated, Baker Petrolite Corporation, and Baker Petrolite LLC*, Civil Action No. 4:15-cv-02915, Exhibit B-1, Identification of Asserted Claims and Limitation Therein, U.S. Pat. No. 8,426,498,Jun. 22, 2016, pp. 1-2.

*Lubrizol Specialty Products, Inc. v. Baker Hughes Incorporated, Baker Petrolite Corporation, and Baker Petrolite LLC*, Civil Action No. 4:15-cv-02915, Exhibit B-3 Burger, Jun. 22, 2016, pp. 1-14.

(56) References Cited

OTHER PUBLICATIONS

*Lubrizol Specialty Products, Inc. v. Baker Hughes Incorporated, Baker Petrolite Corporation, and Baker Petrolite LLC*, Civil Action No. 4:15-cv-02915, Exhibit B-3 Carville, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Eaton, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit B-3 El Gamal, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Holtmyer, Jun. 22, 2016, pp. 1-11.
Sharp, D.G. et al., "Size and Density of Polystyrene Particles Measured by Ultracentrifugation", Biol. Chem., vol. 185, pp. 247-253, (Feb. 16, 1950).
Material Safety Data Sheet for Koch Sure Sol-150 (2000), 1 page.
*Declaration Petitioner v. of Professor Thomas H. Epps, III.*, Case IPR2016-00734, U.S. Pat. No. 8,022,118, Baker Hughes, Inc. Lubrizol Specialty Products, Inc., Mar. 31, 2016, 68 pages.
Curriculum Vitae of Professor Thomas H. Epps, III, 33 pages.
U.S. Appl. No. 11/615,539, Preliminary Amendment dated Mar. 10, 2008 with the USPTO, pp. 1-34.
U.S. Appl. No. 11/615,539, Response to Restriction Requirement dated Jul. 16, 2008 with the USPTO, pp. 1-1.
U.S. Appl. No. 11/615,539, Office Action dated Sep. 18, 2008, pp. 1-19.
U.S. Appl. No. 11/615,539, Office Action dated May 29, 2009, pp. 1-13.
U.S. Appl. No. 11/615,539, Request for Reconsideration to Office Action dated Jun. 24, 2009, pp. 1-35.
U.S. Appl. No. 11/615,539, Office Action dated Jul. 27, 2009, pp. 1-5.
U.S. Appl. No. 11/615,539, Response to Final Office Action dated Aug. 27, 2009, pp. 1-4.
U.S. Appl. No. 11/615,539, Office Action dated Oct. 21, 2009, pp. 1-13.
U.S. Appl. No. 11/615,539, Request for Reconsideration to Office Action dated Apr. 8, 2010, pp. 1-7.
U.S. Appl. No. 11/615,539, Office Action dated Jun. 15, 2010, pp. 1-11.
U.S. Appl. No. 11/615,539, Response to Final Office Action dated Aug. 27, 2010, pp. 1-11.
U.S. Appl. No. 11/615,539, Affidavit Under 37 CFR 1.132 signed by Ray L. Johnston on Aug. 13, 2010, pp. 1-3.
U.S. Appl. No. 11/615,539, Office Action dated Nov. 18, 2010, pp. 1-14.
U.S. Appl. No. 11/615,539, Response to Office Action dated Apr. 8, 2011, pp. 1-7.
U.S. Appl. No. 11/615,539, Notice of Allowance and Fees Due dated May 11, 2011, pp. 1-12.
Transcript of Deposition of Brian Dunn, Ph.D., (excerpt), *Lubrizol Specialty Products, Inc. v Baker Hughes Inc.*, No. 4:15-cv-02915 (S.D. Tex.), Feb. 9, 2016, pp. 1-6.
Conoco CFR 102 Flow Improver, filed in U.S. Pat. No. 381,232, issued as U.S. Pat. No. 4,983,186, Jan. 8, 1991, (approx. 1983-1985).
ConocoPhillips LP 300 Product datasheet, accessed at https://web.archive.org/web/20040604182725/http://liquidpower.com/ProductSolution/ProductSolution.asp, (2003).
ConocoPhillips LP 400 Product Datasheet, accessed at https://web.archive.orgiweb/20040604182725/http://liquidpower.com/Product—Solution/ProductSolution.asp, (2003).
Complaint United States District Court, *Lubrizol Specialty Products, Inc. v. Baker Hughes Inc.*, Case 4:15-cv-02915, Document 1 filed in TXSD on Oct. 5, 2015, p. 1 of 23.
Complaint United States District Court, *Lubrizol Specialty Products, Inc. v. Baker Hughes Inc.*, Case 4:15-cv-02915, Exhibit A, filed on Oct. 5, 2015, U.S. Pat. No. 8,022,118 B2, Sep. 20, 2011; Milligan et al., "Drag Reduction of Asphaltenic rude Oils", pp. 1-16.
Complaint United States District Court, *Lubrizol Specialty Products, Inc. v. Baker Hughes Inc.*, Case 4:15-cv-02915, Exhibit B, filed on Oct. 5, 2015, U.S. Pat. No. 8,426,498 B2, Apr. 23, 2013; Milligan et al., "Drag Reduction of Asphaltenic rude Oils", pp. 1-15.
Complaint United States District Court, *Lubrizol Specialty Products, Inc. v. Baker Hughes Inc.*, Case 4:15-cv-02915, Exhibit C, filed on Oct. 5, 2015, U.S. Pat. No. 8,450,249 B2, May 28, 2013; Milligan et al., "Drag Reduction of Asphaltenic rude Oils", pp. 1-15.
Complaint United States District Court, *Lubrizol Specialty Products, Inc. v. Baker Hughes Inc.*, Case 4:15-cv-02915, Exhibit D, filed on Oct. 5, 2015, U.S. Pat. No. 8,450,250 B2, May 28, 2013; Milligan et al., "Drag Reduction of Asphaltenic rude Oils", pp. 1-15.
Complaint United States District Court, *Lubrizol Specialty Products, Inc. v. Baker Hughes Inc.*, Case 4:15-cv-02915, Exhibit E, filed on Oct. 5, 2015, Marketing Brochure, Flo Ultima 91000 DRA Increased Pipeline Flow of Heavy Canadian Crude Oil Blendby 44%; bakerhughes.com, Aug. 2014, pp. 1 of 2.
Complaint United States District Court, *Lubrizol Specialty Products, Inc. v. Baker Hughes Inc.*, Case 4:15-cv-02915, Exhibit F, filed on Oct. 5, 2015, "Enhancing Flow for Canadian Crudes", Heavy Oil, Lacy Rosson, Baker Hughes, Nov. 2014, EPmag.com,pp. 1-4.
Complaint United States District Court, *Lubrizol Specialty Products, Inc. v. Baker Hughes Inc.*, Case 4:15-cv-02915, Exhibit G, filed on Oct. 5, 2015, Marketing Brochure, Flo Ultima 91000 DRA Increased Pipeline Flow of Heavy Canadian Crude Oil Blendby 44%, http://bakerhughes.com/news-and-media/resources/case histories!, Aug. 21, 2015, pp. 1-2.
Complaint United States District Court, *Lubrizol Specialty Products, Inc. v. Baker Hughes Inc.*, Case 4:15-cv-02915, Exhibit H, filed on Oct. 5, 2015, Marketing Brochure, Flo Ultima Heavy Crude Drag Reducing Agents, Bakerhughes.com, Jun. 2014, pp. 1-2.
Complaint United States District Court, *Lubrizol Specialty Products, Inc. v. Baker Hughes Inc.*, Case 4:15-cv-02915, Exhibit I filed on Oct. 5, 2015, United States Securities and Exchange Commission, Washington, D.C., Form 8-K, Jan. 20, 2015, BakerHughes Incorporated, News Release, pp. 1-26.
Complaint United States District Court, *Lubrizol Specialty Products, Inc. v. Baker Hughes Inc.*, Case 4:15-cv-02915, filed on Oct. 5, 2015, Civil Cover Sheet, 1 page.
United States District Court, *Lubrizol Specialty Products. Inc. v. Baker Hughes Inc., Baker Petrolite Corp., and Baker Petrolite LLC.*, filed on Oct. 5, 2015, Case 4:15-cv-02915, First Amended Complaint, Apr. 26, 2016, pp. 1-29.
United States District Court, *Lubrizol Specialty Products. Inc. v. Baker Hughes Incorporated*, filed on Oct. 5, 2015, tease 4:15-cv-02915, Baker Hughes Incorporated's Answer and Affirmation Defenses, Plaintiffs Complaint for Patent Infringement, Oct. 28, 2015, pp. 1-14.
United States District Court, *Lubrizol Specialty Products. Inc. v. Baker Hughes Incorporated*, filed on Oct. 5, 2015; case 4:15-cv-02915, Baker Hughes Incorporated's Answer and Affirmation Defenses to Plaintiff's Amended Complaint or PatentInfringement and Baker Hughes Incorporated's Counterclaims, May 10, 2016, pp. 1-190.
United States District Court, *Lubrizol Specialty Products. Inc. v. Baker Hughes Incorporated, Baker Petrolite corporation, and Baker Petrolite LLC.*, filed on Oct. 5, 2015, Case 4:15-cv-02915, Baker Petrolite Corporation's and Baker Petrolite LLC'sAnswer and Affirmative Defenses to Plaintiff's Amended Complaint for Patent Infringement and Baker Petrolite LLC's Counterclaims, May 18, 2016, pp. 1-190.
United States District Court, *Lubrizol Specialty Products. Inc. v. Baker Hughes Incorporated, Baker Petrolite Corp., and Baker Petrolite LLV.*, filed on Oct. 5, 2015; Case 4:15-cv-02915, Lubrizol Specialty Products, Inc.'s Answer to Baker HughesIncorporated's Counterclaims, Jun. 3, 2016, pp. 1-21.
United States District Court, *Lubrizol Specialty Products. Inc. v. Baker Hughes Incorporated, Baker Petrolite Corp., and Baker Petrolite LLC.*, filed on Oct. 5, 2015, Case 4:14-cv-02915, Lubrizol Specialty Products, Inc.'s Answer to Baker PetroliteLLC and Baker Petrolite Corporation's Counterclaims, Jun. 7, 2016, pp. 1-21.
United States District Court, *Lubrizol Specialty Products, Inc.v. Flowchem LLC*, filed on Oct. 5, 2015, Case 4:15-cv-02917, Complaint, pp. 1-17.

(56) References Cited

OTHER PUBLICATIONS

United States District Court, *Lubrizol Specialty Products, Inc. v. Flowchem LLC*, filed on Oct. 5, 2015, Case 4:15-cv-02917, Exhibit A, U.S. Pat. No. 8,022,118 B2, Sep. 20, 2011, "Drag Reduction of Asphaltenic Crude Oils", Milligan et al., pp. 1-16.
United States District Court, *Lubrizol Specialty Products, Inc. v. Flowchem LLC*, filed on Oct. 5, 2015, Case 4:15-cv-02917, Exhibit B, U.S. Pat. No. 8,426,498 B2, Apr. 23, 2013, "Drag Reduction of Asphaltenic Crude Oils", Milligan et al., pp. 1-15.
United States District Court, *Lubrizol Specialty Products, Inc. v. Flowchem LLC*, filed on Oct. 5, 2015, Case 4:15-cv-02917, Exhibit C, U.S. Pat. No. 8,450,249 B2, May 28, 2013, "Drag Reduction of Asphaltenic Crude Oils", Milligan et al., pp. 1-15.
United States District Court, *Lubrizol Specialty Products, Inc. v. Flowchem LLC*, filed on Oct. 5, 2015, Case 4:15-cv-02917, Exhibit D, U.S. Pat. No. 8,450,250 B2, May 28, 2013, "Drag Reduction of Asphaltenic Crude Oils",Milligan et al., pp. 1-15.
United States District Court, *Lubrizol Specialty Products, Inc. v. Flowchem LLC*, filed on Oct. 5, 2015, Case 4:15-cv-02917, Exhibit E, Marketing Brochure, http://www.flowchem-dra.com/index.php/turboflo-applicatons/heavy crude.html, FlowChem, HeavyCrude, Aug. 21, 2015, pp. 1-2.
United States District Court, *Lubrizol Specialty Products, Inc. v. Flowchem LLC*, filed on Oct. 5, 2015, Case 4:15-cv-02917, Exhibit F, Marketing Brochure, http://flowchem-dra.com/index.php/how-turboflo-works.html, How Turboflo Works, Aug. 28, 2015,pp. 1-7.
United States District Court, *Lubrizol Specialty Products, Inc. v. Flowchem LLC*, filed on Oct. 5, 2015, Case 4:15-cv-02917, Civil Cover Sheet, p. 1 of 1.
United States District Court, *Lubrizol Specialty Products, Inc. v. Flowchem LLC*, filed on Dec. 4, 2015, Case 4:15-cv-02917, Amended Complaint, pp. 1-24.
United States District Court, *Lubrizol Specialty Products, Inc. v. Flowchem LLC*, filed on Dec. 4, 2015, Case 4:15-cv-02917, Exhibit A, U.S. Pat. No. 8,022,118 B2, Sep. 20, 2011, Drag Reduction of Asphaltenic Crude Oils, Milligan et al., pp. 1-16.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Inaoka, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Kowalik, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Malik '121, Jun. 22, 2016, pp. 1-7.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Malone, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Motier, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Nalman, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Schmerwitz, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Shen, Jun. 22, 2016, pp. 1-10.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Smith, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Weitzen, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit C-1, Identification of Asserted Claims and Limitations Therein, U.S. Pat. No. 3,450,249,Jun. 22, 2016, pp. 1-2.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Burger, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Carville, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Eaton, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 El-Gamal, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Holtmyer, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Inaoka, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Kowalik, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Malik '121, Jun. 22, 2016, pp. 1-7.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Malone, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Motier, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Naiman, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Schmerwitz, Jun. 22, 2016, pp. 1-10.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Shen, Jun. 22, 2016, pp. 1-10.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Smith, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Weitzen, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit D-1, Identification of Asserted Claims and Limitations Therein, U.S. Pat. No. 3,450,250, Jun. 22, 2016, pp. 1-3.
Lubrizol Specialty Products, Inc. Product Datasheet for EP 1000 Flow Improver, Exhibit 2017, Jul. 2014, 2 pages.
USPTO Public Pair Assignment Data for U.S. Appl. No. 07/381,232 for Method and Compositions for Reduction of Drag in Hydrocarbon Fluids, Jun. 27, 2016, Exhibit 2018, 2 pages.
Pat Swafford, Unique Qualties of Canadian Bitumen and Synthetic Crudes, www.digitalrefining.com/article/1000461, PTQ 2010, pp. 103-106, Exhibit 2019.
A Dictionary for the Oil and Gas Industry, First Edition, The University of Texas at Austin Petroleum Extension Service, 2005, Catalog No. 1.35010, ISBn 0-88698-213-8, 4 pages, Exhibit 2020.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Malone, Jun. 22, 2016, pp. 1-19.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Motier, Jun. 22, 2016, pp. 1-19.

(56) References Cited

OTHER PUBLICATIONS

*Lubrizol Specialty Products, Inc. v. Baker Hughes Incorporated, Baker Petrolite Corporation, and Baker Petrolite LLC*, Civil Action No. 4:15-cv-02915, Exhibit D-3 Naiman, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Schmerwitz, Jun. 22, 2016, pp. 1-16.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Shen, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Smith, Jun. 22, 2016, pp. 1-20.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Weitzen, Jun. 22, 2016, pp. 1-16.
*Lubrizol Specialty Products, Inc. v. Flowchem LLC*, Civil Action No. 4:15-cv-02917, Defendant Flowchem LIC's Preliminary Invalidity Contentions Pursuant to P.R. 3-3, Jun. 22, 2016, pp. 1-65.
*Lubrizol Specialty Products, Inc. v. Flowchem LLC*, Civil Action No. 4:15-cv-02917, Expert Declaration of Dr. Robert K. Prud'homme, Jun. 22, 2016, pp. 1-20.
*Lubrizol Specialty Products, Inc. v. Flowchem LLC*, Civil Action No. 4:15-cv-02917, Exhibit A, Jun. 22, 2016, pp. 1-28.
*Lubrizol Specialty Products, Inc. v. Flowchem LLC*, Civil Action No. 4:15-cv-02917, Exhibit B, Jun. 22, 2016, pp. 1-2.
*Lubrizol Specialty Products, Inc. v. Flowchem LIC*, Civil Action No. 4:15-cv-02917, Exhibit C, Jun. 22, 2016, pp. 1-4.
*Lubrizol Specialty Products, Inc. v. Flowchem LLC*, Civil Action No. 4:15-cv-02917, Exhibit D1, Jun. 22, 2016, pp. 1-36.
*Lubrizol Specialty Products, Inc. v. Flowchem LLC*, Civil Action No. 4:15-cv-02917, Exhibit D2, Jun. 22, 2016, pp. 1-53.
*Lubrizol Specialty Products, Inc. v. Flowchem LLC*, Civil Action No. 4:15-cv-02917, Exhibit D3, Jun. 22, 2016, pp. 1-62.
*Lubrizol Specialty Products, Inc. v. Flowchem LLC*, Civil Action No. 4:15-cv-02917, Exhibit D4, Jun. 22, 2016, pp. 1-70.
*Lubrizol Specialty Products, Inc. v. Flowchem LLC*, Civil Action No. 4:15-cv-02917, Exhibit E1, Jun. 22, 2016, pp. 1-25.
*Lubrizol Specialty Products, Inc. v. Flowchem LLC*, Civil Action No. 4:15-cv-02917, Exhibit E2, Jun. 22, 2016, pp. 1-12.
*Lubrizol Specialty Products, Inc. v. Flowchem LLC*, Civil Action No. 4:15-cv-02917, Exhibit E3, Jun. 22, 2016, pp. 1-12.
*Lubrizol Specialty Products, Inc. v. Flowchem LLC*, Civil Action No. 4:15-cv-02917, Exhibit E4, Jun. 22, 2016, pp. 1-17.
*Lubrizol Specialty Products, Inc. v. Flowchem LLC*, Civil Action No. 4:15-cv-02917, Exhibit F1, Jun. 22, 2016, pp. 1-31.
*Lubrizol Specialty Products, Inc. v. Flowchem LLC*, Civil Action No. 4:15-cv-02917, Exhibit F2, Jun. 22, 2016, pp. 1-34.
*Lubrizol Specialty Products, Inc. v. Flowchem LLC*, Civil Action No. 4:15-cv-02917, Exhibit F3, Jun. 22, 2016, pp. 1-37.
*Lubrizol Specialty Products, Inc. v. Flowchem LLC*, Civil Action No. 4:15-cv-02917, Exhibit F4, Jun. 22, 2016, pp. 1-43.
*Lubrizol Specialty Products, Inc. v. Flowchem LLC*, Civil Action No. 4:15-cv-02917, Exhibit G1, Jun. 22, 2016, pp. 1-9.
*Lubrizol Specialty Products, Inc. v. Flowchem LLC*, Civil Action No. 4:15-cv-02917, Exhibit G2, Jun. 22, 2016, pp. 1-8.
*Lubrizol Specialty Products, Inc. v. Flowchem LLC*, Civil Action No. 4:15-cv-02917, Exhibit G3, Jun. 22, 2016, pp. 1-9.
*Lubrizol Specialty Products, Inc. v. Flowchem LLC*, Civil Action No. 4:15-cv-02917, Exhibit G4, Jun. 22, 2016, pp. 1-12.
*Lubrizol Specialty Products, Inc. v. Flowchem LLC*, Civil Action No. 4:15-cv-02917, Exhibit I-11, Jun. 22, 2016, pp. 1-14.
*Lubrizol Specialty Products, Inc. v. Flowchem LLC*, Civil Action No. 4:15-cv-02917, Exhibit H2, Jun. 22, 2016, pp. 1-10.
*Lubrizol Specialty Products, Inc. v. Flowchem LLC*, Civil Action No. 4:15-cv-02917, Exhibit H3, Jun. 22, 2016, pp. 1-11.
*Lubrizol Specialty Products, Inc. v. Flowchem LLC*, Civil Action No. 4:15-cv-02917, Exhibit H4, Jun. 22, 2016, pp. 1-17.

*Baker Hughes Incorporatedv. Lubrizol Specialty Products, Inc.*, Case IPR2016-00734, U.S. Pat. No. 8,022,118, Petition for Inter Partes Review, Apr. 1, 2016, pp. 1-66.
*Baker Hughes Incorporated v. Lubrizol Specialty Products, Inc.*, Case IPR2016-00734, U.S. Pat. No. 8,022,118, Lubrizol Specialty Products, Inc.'s Preliminary Response to Petition for Inter Partes Review of U.S. Pat. No. 8,022,118 Pursuant to 37 CFR42.107, Jul. 6, 2016, pp. 1-74.
*Baker Hughes Incorporated v. Lubrizol Specialty Products, Inc.*, Case IPR2016-00734, U.S. Pat. No. 8,022,118, Declaration of Kenneth W. Smith, Exhibit 2001, Jul. 6, 2016, pp. 1-13.
Concise Oxford American Dictionary, Oxford University Press, Exhibit 2002, 2006, p. 671.
Oxford English Reference Dictionary, Second Edition, Edited by Judy Pearsall and Bill Trumble, Oxford University Press, Exhibit 2003, 2006, p. 1103.
Collins English Dictionary, HarperCollins Publishers, Seventh Edition 2005, Uk Edition ISBN 0-00-719153-7, Exhibit 2004, p. 1236.
Oil & Gas Journal, vol. 81, No. 50, Dec. 12, 1983, Well Completion Technology Report, Exhibit 2005, 3 pages.
120 Oil & Gas Journal, Dec. 12, 1983, Technology, Guide to Export Crudes for the '80s-12, Appendix A Crude Stream Codes, Updated Jan. 2013, p. A-1 to A-18, Exhibit 2006.
Association of Oil Pipe Lines, Pipeline Transportation of Diluted Bitumen from the Canadian Oil Sands, Oct. 14, 2011, 3 pages, Exhibit 2007.
Mark Bobra et al, A Catalogue of Crude Oil and Oil Product Properties, 1990 version, Sep. 1990, 15 pages, Exhibit 2008.
Physical Properties User's Guide, License Agreement Chemstations Inc., Copyright 2004, Version 5.4, Appendix I Crude Oil Databank, Exhibit 2009.
Copyright Environment Canada, Emergencies Science and Technology Division, Bow River Heavy, Exhibit 2010, 1 p.
Otto P. Strausz et al., The Chemistry of Alberta Oil Sands, Bitumens and Heavy Oils, University of Alberta, Calgary, Canada, Digitized by the Internet Archive in 2015, https://archive.org/details/chemistryofalber00stra, Exhibit 2011, 22 pages.
Comprehensive Organic Name Reactions and Reagents, vol. 3, Zerong Wang, a John Wiley & Sons, Inc. Publication, 395 Ziegler-Natta Polymerization (Ziegler-Natta Olefin Polymerization), 2010, Exhibit 2012, 40 pages.
Oil & Gas Journal, Technology, Dec. 19, 1983, Guide to Export Crudes for the '80s-13, Assay Series Concludes With Index, U.S. Streams, Leo R. Aalund, Refining Editor, Exhibit 2013, 5 pages.
EPmag.com, Heavy Oil, Nov. 2014, Enhancing Flow for Canadian Crudes, New DRA Improves the Movement of Heavy Oil Through Pipelines, Lacy Rosson, Baker Hughes, Exhibit 2014, 3 pages.
Flowchem Industries, Heavy Crude, Flowchem DRA, https://flowchem-dra.com/index.php/turboflo-applications/heavy-arude.html—, Aug. 21, 2015, Exhibit 2015, 2 pages.
U.S. Pat. No. 6,730,750 B2, May 4, 2004, Eaton et al., Methods for Forming Amorphous Ultra-High Molecular Weight Polyolefins for Use As Drag Reducing Agents, Exhibit 2016.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Burger, Jun. 22, 2016, pp. 1-21.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Carville, Jun. 22, 2016, pp. 1-16.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Eaton, Jun. 22, 2016, pp. 1-19.
*Lubrizol Specialty Products, Inc. v. Baker Hughes Incorporation, Baker Petrolite Corporation, and Baker Petrolite LLC*, Civil Action No. 4:15-cv-02915, Exhibit D-3 El-Gamal, Jun. 22, 2016, pp. 1-18.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Holtmyer, Jun. 22, 2016, pp. 1-18.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Inaoka, Jun. 22, 2016, pp. 1-18.

(56) References Cited

OTHER PUBLICATIONS

*Lubrizol Specialty Products, Inc. v. Baker Hughes Incorporation, Baker Petrolite Corporation, and Baker Petrolite LLC*, Civil Action No. 4:15-cv-02915, Exhibit D-3 Kowalik, Jun. 22, 2016, pp. 1-14.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Malik '121, Jun. 22, 2016, pp. 1-13.
Otto P. Strausz et al., "The Chemistry of Alberta Oils Sands, Bitumens and Heavy Oils", Alberta Energy Research Institute, Calgary, Alberta, Canada, pp. 464-480 (2003).
Polymer Handbook, Fourth Edition, J. Brandrup et al., John Wiley & Sons, Inc., "Solubility Parameter Values", (1999), pp. VII/675-VII715.
Jacques L Zakin et al., "Effect of Polymer Molecular Variables on Drag Reduction", J. Macromol. Sci.-Phys., B18(4), pp. 795-815, (1980).
D. Mowla et al., "Experimental Study of Drag Reduction by a Polymeric Additive in Slug Two-Phase Flow of Crude Oil and Air in Horizontal Pipes", Chemical Engineering Science, 61 (2006), pp. 1549-1554.
Rafael Martinez-Palou et al., Transportation of Heavy and Extra-Heavy Crude Oil by Pipeline: A Review, Journal of Petroleum Science and Engineering, 75 (2011), pp. 274-282.
Maria A. Barrufet et al, "Reliable Heavy Oil-Solvent Viscosity Mixing Rules for Viscosities Up to 450 K, Oil-Solvent Viscosity Ratios Up to 4 x 10(5), and any Solvent Proportion", Fluid Phase Equilibria 213 (2003), pp. 65-79.
Lewis J. Fetters et al., "Chain Dimensions and Entanglement Spacings in Dense Macromolecular Systems", Journal of Polymer Science Part B: Polymer Physics, vol. 37, pp. 1023-1033, (1999).
Felters, L.J. et al., "Chain Dimensions and Entanglement Spacings", in Mark, J.E. (Ed.), Physical Properties of Polymers Handbook, 2nd Ed., pp. 447-454, Springer Science+Business Media, Woodbury, NY, (2007).
Tait, P.J.T. et al., "Thermodynamic Studies on Poly(alpha-olefin)-Solvent Systems", Polymer vol. 11, (1970), pp. 359-373.
"Polymers: A Property Database", 2nd Ed., Ellis, B. et al., (Eds.), CRC Press, Boca Raton, FL, (2016), pp. 1-5.
Handbook of Thermoplastics, 2nd Ed., Olabisi, 0. et al. (Eds.), CRC Press, Boca Raton, FL, (2016), Chapter 5 Polyacrylates, pp. 169-192.
United States District Court, *Lubrizol Specialty Products, Inc. v. Flowchem LLC*, filed on Dec. 4, 2015, Case 4:15-cv-02917, Exhibit B, U.S. Pat. No. 8,426,498 B2, Apr. 23, 2013, Drag Reduction of Asphaltenic Crude Oils, Milligan et al., pp. 1-15.
United States District Court, *Lubrizol Specialty Products, Inc. v. Flowchem LLC*, filed on Dec. 4, 2015, Case 4:15-cv-02917, Exhibit C, U.S. Pat. No. 8,450,249 B2, May 28, 2013, Drag Reduction of Asphaltenic Crude Oils, Milligan et al., pp. 1-15.
United States District Court, *Lubrizol Specialty Products, Inc. v. Flowchem LLC*, filed on Dec. 4, 2015, Case 4:15-cv-02917, Exhibit D, U.S. Pat. No. 8,450,250 B2, May 28, 2013, Drag Reduction of Asphaltenic Crude Oils, Milligan et al., pp. 1-15.
United States District Court, *Lubrizol Specialty Products, Inc. v. Flowchem LLC*, filed on Dec. 4, 2015, Case 4:15-cv-02917, Exhibit E, Marketing Brochure, http://www.flowchem-dra.com/index.php/turboflo-applicatons/heavy crude.html, FlowChem, HeavyCrude, Aug. 21, 2015, pp. 1-3.
United States District Court, *Lubrizol Specialty Products, Inc. v. Flowchem LLC*, filed on Dec. 4, 2015, Case 4:15-cv-02917, Exhibit F, Marketing Brochure, http://www.flowchem-dra.com/index.php/how-turboflo-works.html, FlowChem, How Turboflo Works, Aug. 28, 2015, pp. 1-7.
United States District Court, *Lubrizol Specialty Products, Inc. v. Flowchem LLC*, filed on Mar. 30, 2016, Case 4:15-cv-02917, Defendents Flowchem LLC's Answer to Plaintiff Lubrizol Specialty Products, Inc.'s Amended Complaint and Flowchem'sCounterclaim, pp. 1-17.
United States District Court, *Lubrizol Specialty Products, Inc. v. Flowchem LLC*, filed on Apr. 20, 2016, Case 4:15cv-02917, Defendent Flowchem LLC's Amended Answer to Plaintiff Lubrizol Specialty Products, Inc.'s Amended complaint and Flowchem'sAmended Counterclaim, pp. 1-162.
United States District Court, *Lubrizol Specialty Products, Inc. v. Flowchem LLC*, filed on May 9, 2016, Case 4:15cv-02917, Lubrizol Specialty Products, Inc.'s Answer to Flowchem LLC's Amended Counterclaim, pp. 1-18.

\* cited by examiner

MONOMER SELECTION TO PREPARE ULTRA HIGH MOLECULAR WEIGHT DRAG REDUCER POLYMER

CROSS-REFERENCE TO RELATED APPLICATIONS

This application is a continuation of U.S. patent application Ser. No. 13/208,951, filed Aug. 12, 2011, now U.S. Pat. No. 9,676,878, which is herein incorporated in its entirety.

A process for producing ultra high molecular weight polymers.

BACKGROUND OF THE INVENTION

When fluids are transported by a pipeline, there is typically a drop in fluid pressure due to friction between the wall of the pipeline and the fluid. Due to this pressure drop, for a given pipeline, fluid must be transported with sufficient pressure to achieve the desired throughput. When higher flow rates are desired through the pipeline, more pressure must be applied due to the fact that, as flow rates are increased, the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of a fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag reducing polymers typically have molecular weights in excess of five million.

However not every monomer can be polymerized as ultra high molecular weight polymers. Even when monomers are selected that are known to have the ability to be polymerized as ultra high molecular weight polymer not all can be shown to impart drag reducing properties. There exists a need to find which polymers can impart drag reducing properties.

BRIEF SUMMARY OF THE DISCLOSURE

The process begins by obtaining a first batch of monomers selected from a group of acrylates with a molecular weight equal to or less than butyl acrylate and/or methacrylate with a molecular weight equal to or less than butyl methacrylate. A second batch of monomers is then selected from a group of acrylates with a molecular weight greater than butyl acrylate and/or methacrylate with a molecular weight greater than butyl methacrylate. A mixture is then prepared by mixing the first batch of monomers and the second batch of monomers, wherein the second batch of monomers are greater than 50% by weight of the mixture. Finally, the mixture is polymerized to produce an ultra high molecular weight polymer.

In yet another embodiment a process is taught of obtaining a first batch of monomers selected from a group of acrylates with side alkyl chains having four or less carbons and/or methacrylates with side alkyl chains having four or less. A second batch of monomers are selected from a group of acrylates with side alkyl chains having greater than four carbons and/or methacrylates with side alkyl chains greater than four carbons. A mixture is then prepared by mixing the first batch of monomers and the second batch of monomers, wherein the second batch of monomers are greater than 50% by weight of the mixture. Finally, the mixture is polymerized to produce an ultra high molecular weight polymer.

In another embodiment a process is taught for selecting monomers to polymerize into an ultra high molecular weight polymer. In this embodiment a process is taught of first obtaining a first batch of monomers selected from a group of acrylates with side alkyl chains having four or less carbons and/or methacrylates with side alkyl chains having four or less. A second batch of monomers are selected from a group of acrylates with side alkyl chains having greater than four carbons and/or methacrylates with side alkyl chains greater than four carbons. A mixture is then prepared by mixing the first batch of monomers and the second batch of monomers, wherein the second batch of monomers are greater than 50% by weight of the mixture. Finally, the mixture is polymerized to produce an ultra high molecular weight polymer.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
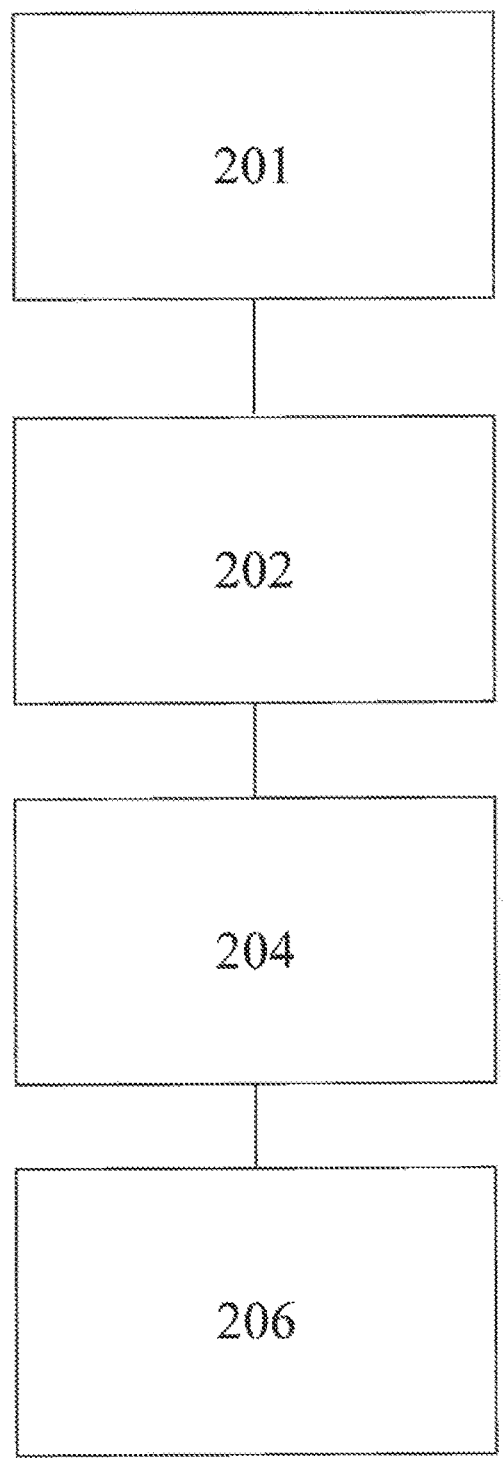
FIG. 1 depicts a process of preparing an ultra high molecular weight polymer.

In one embodiment a process is taught of preparing ultra high molecular weight polymers to impart maximum drag reduction properties. FIG. 1 is a flowchart depicting this process. Step 201 describes the first step in the process of obtaining a first batch of monomers selected from acrylates and/or methacrylates. The selection to use solely acrylates, solely methacrylates or a combination of acrylates and methacrylates depends upon different pricing models and different applications of the ultra high molecular weight polymer produced at the end. In this embodiment the acrylates can have a molecular weight equal to or less than butyl acrylate. Additionally, the methacrylates can have a molecular weight equal to or less than butyl methacrylate. Examples of acrylates or methacrylates that can be in the first batch include methyl acrylate, ethyl acrylate, propyl acrylates, butyl acrylates, methyl methacrylate, ethyl methacrylate, propyl methacrylates, butyl methacrylates and combinations and isomeric forms of these acrylates and methacrylates.

Step 202 describes the second step in the process wherein a second batch of monomers is selected from acrylates and/or methacrylates. In this embodiment the acrylates can have a molecular weight greater than butyl acrylate. Additionally, the methacrylates can have a molecular weight greater than butyl methacrylate. Examples of acrylates or methacrylates that can be in the second batch include pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, isooctyl acrylate, isooctyl methacrylate, isodecyl acrylate, isodecyl methacrylate, lauryl acrylate, lauryl methacrylate, 2-ethylhexyl acrylate, 2-ethylhexyl methacrylate, benzyl acrylate, benzyl methacrylate, 2-phenylethyl acrylate, 2-phenylethyl methacrylate, tridecyl acrylate, tridecyl methacrylate, isobornyl acrylate, isobornyl methacrylate, 3,5,5-trimethylhexyl acrylate, 3,5,5-trimethylhexyl methacrylate, 3,3,5-trimethylcyclohexyl acrylate, 3,3,5-trimethylcyclohexyl methacrylate and combinations and isomeric forms of these acrylates and methacrylates.

A mixture can now be prepared 204 by mixing the first batch 201 with the second batch 202. In this mixture different quantities of second batch by weight can be used when compared to the total mixture by weight. In one embodiment the second batch is greater than 50% by weight of the mixture, in other embodiment the second batch can be 50%, 55%, 60%, 65%, 70%, 75%, 80%, 85%, 90%, 98%, 99%, or even 100% of the mixture is of the second batch.

Finally the mixture is polymerized to produce an ultra high molecular weight polymer 206.

Figure 2:
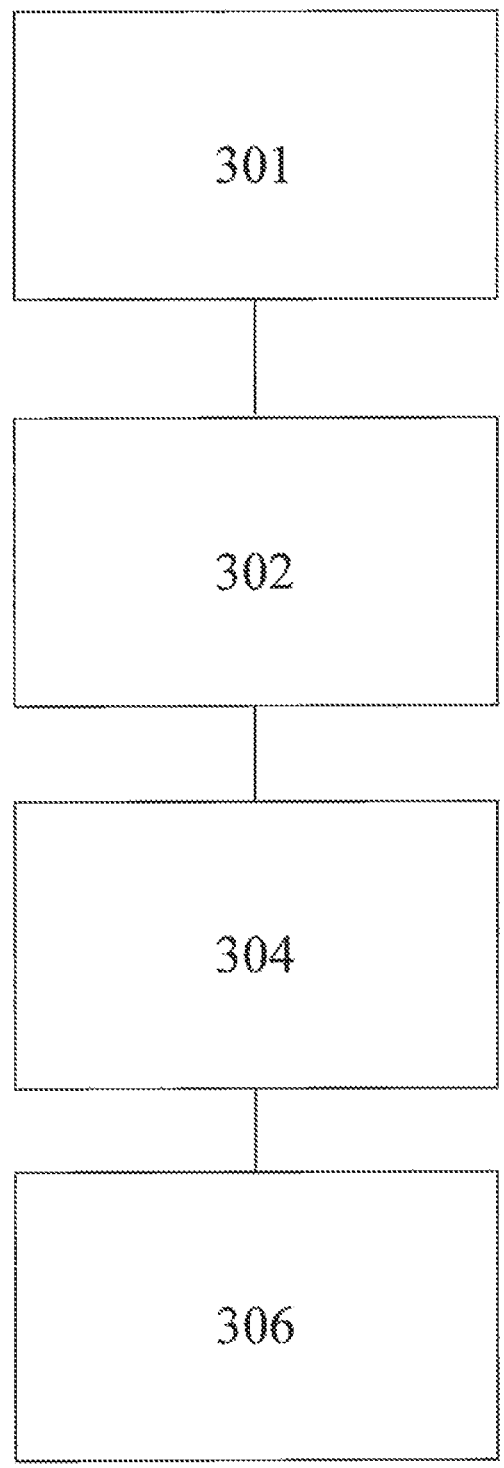
FIG. 2 depicts a process of preparing an ultra high molecular weight polymer.

In yet another embodiment a process is taught of preparing ultra high molecular weight polymers to impart maximum drag reduction properties. FIG. 2 is a flowchart depicting this process. Step 301 describes the first step in the process of obtaining a first batch of monomers selected from acrylates and/or methacrylates. In this embodiment the acrylates can have a side alkyl chains having four or less carbons. Additionally the methacrylates can have side alkyl chains having four or less carbons.

Step 302 describes the second step in the process wherein a second batch of monomers is selected from acrylates and/or methacrylates. In this embodiment the acrylates can have a side alkyl chains having greater than four carbons. Additionally the methacrylates can have side alkyl chains having greater than four carbons. In yet another embodiment step 303 can also select the acrylates and methacrylates with side alkyl branching chains versus those with side alkyl straight chains.

A mixture can now be prepared 304 by mixing the first batch 301 with the second batch 302. In this mixture different quantities of second batch by weight can be used when compared to the total mixture by weight. In one embodiment the second batch is greater than 50% by weight of the mixture, in other embodiment the second batch can be 50%, 55%, 60%, 65%, 70%, 75%, 80%, 85%, 90%, 98%, 99%, or even 100% of the mixture is of the second batch.

Finally the mixture is polymerized to produce an ultra high molecular weight polymer 306.

The polymerization steps, as shown above, to produce the ultra high molecular weight polymers can be prepared by a variety of methods. One method that can be used is emulsion polymerization.

In one embodiment the ultra high molecular weight polymer can be prepared via emulsion polymerization of a reaction mixture comprising one or more monomers, a continuous phase, at least one surfactant, and an initiation system. The continuous phase generally comprises at least one component selected from the group consisting of water, polar organic liquids, and mixtures thereof. When water is the selected constituent of the continuous phase, the reaction mixture can also comprise a buffer. Additionally, as described in more detail below, the continuous phase can optionally comprise a hydrate inhibitor. In another embodiment, the ultra high molecular weight polymer can be in the form of a suspension or solution according to any method known in the art. In this embodiment the monomers that are used to produce the ultra high molecular weight polymer come from the mixture produced from the method above.

In one embodiment the ultra high molecular weight polymer can comprise the residues of at least one monomer having a heteroatom. As stated above, the term "heteroatom" includes any atom that is not a carbon or hydrogen atom. Specific examples of heteroatoms include, but are not limited to, oxygen, nitrogen, sulfur, phosphorous, and/or chlorine atoms. In one embodiment, the drag reducing polymer can comprise at least about 10 percent, at least about 25 percent, or at least 50 percent of the residues of monomers having at least one heteroatom. Additionally, the heteroatom can have a partial charge. As used herein, the term "partial charge" is defined as an electric charge, either positive or negative, having a value of less than 1.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in J. Soc. Cosmet. Chem., 1, 311 (1949) and J. Soc. Cosmet. Chem., 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Examples of high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPOSYL L-30 from Hampshire Chemical Corp., Lexington, Mass.).

Examples of high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly (ethyleneoxy)ethanols (available as the IGEPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-S-7,15-S-9,15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150.degree. F., in the range of from about 20 to about 80.degree. F., or in the range of from 30 to 60.degree. F. For example, monoethylene glycol qualifies as a hydrate inhibitor because the gas hydrate formation temperature of distilled water at 2,000 psia is about 70.degree. F., while the gas hydrate formation temperature of a 1:1 mixture of distilled water and monoethylene glycol at 2,000 psia is about 28.degree. F. Thus, monoethylene glycol lowers the gas hydrate formation temperature of distilled water at 2,000 psia by about 42.degree. F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

In forming the reaction mixture, the monomer, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon. The temperature of the system can be kept at a level from the freezing point of the continuous phase up to about 60.degree. C., in the range of from about 0 to about 45.degree. C., or in the range of from 0 to 30.degree. C. The system pressure can be maintained in the range of from about 5 to about 100 psia, in the range of from about 10 to about 25 psia, or about atmospheric pressure. However, higher pressures up to about 300 psia can be necessary to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
| --- | --- | --- |
| Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer:Initiaior (molar ratio) | $1 \times 10^3$:1- $5 \times 10^6$:1 | $5 \times 10^3$:1- $2 \times 10^6$:1 |
| Monomer:Reducing Comp. (molar ratio) | $1 \times 10^3$:1- $5 \times 10^6$:1 | $1 \times 10^4$:1- $2 \times 10^6$:1 |
| Accelerator:Initiator (molar ratio) | 0.001:1-10:1 | 0.005:1-1:1 |
| Buffer | 0 to amount necessary to reach pH of initiation (initiator dependent, typically between about 6.5-10) | |
| Optional hydrate inhibitor | If present, the hydrate inhibitor can have a hydrate inhibitor-to-water weight ratio from about 1:10 to about 10:1, about 1:5 to about 5:1, or 2:3 to 3:2. | |

The emulsion polymerization reaction yields a latex composition comprising a dispersed phase of solid particles and a liquid continuous phase. The latex can be a stable colloidal dispersion comprising a dispersed phase of high molecular weight polymer particles and a continuous phase comprising water. The colloidal particles can comprise in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can comprise in the range of from about 0.1 to about 10 percent by weight of the latex, or in the range of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex after polymerization to provide the desired amount of hydrate inhibitor in the continuous phase of the latex.

In one embodiment of the present invention, the ultra high molecular weight polymer of the dispersed phase of the latex can have a weight average molecular weight ($M_w$) of at least about $1\times10^6$ g/mol, at least about $2\times10^6$ g/mol, or at least $5\times10^6$ g/mol. The colloidal particles of ultra high molecular weight polymer can have a mean particle size of less than about 10 microns, less than about 1,000 nm (1 micron), in the range of from about 10 to about 500 nm, or in the range of 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The continuous phase can have a pH in the range of from about 4 to about 10, or in the range of from about 6 to about 8, and contains few if any multi-valent cations.

In one embodiment the ultra high molecular weight polymer can comprise at least about 10,000, at least about 25,000, or at least 50,000 repeating units selected from the residues of the above mentioned monomers.

Additionally the ultra high molecular weight polymer can be utilized to impart drag reducing properties in liquid hydrocarbon. Liquid hydrocarbons can be any carbon liquid product including but not limited to crude oil, heavy crude oil, and refined products.

In this embodiment when the ultra high molecular weight polymer is added to liquid hydrocarbon a treated liquid hydrocarbon is produced. In this embodiment the viscosity of the treated liquid hydrocarbon is not less than the viscosity of the liquid hydrocarbon prior to treatment with the ultra high molecular weight polymer. The drag reducing properties provided by the ultra high molecular weight polymer can include reducing the friction loss associated with the turbulent flow through a pipeline by suppressing the growth of turbulent eddies. The addition of the ultra high molecular weight polymer to the liquid hydrocarbons can be from 0.1 to about 500 ppmw.

The following examples of certain embodiments of the invention are given. Each example is provided by way of explanation of the invention, one of many embodiments of the invention, and the following examples should not be read to limit, or define, the scope of the invention.

Example 1: Alkyl Acrylates

The following monomers were emulsion polymerized and tested for their drag reducing properties:

| Alkyl Acrylate | Carbon Number | Alkyl Chain | Inherent Viscosity | % Drag Reduction in Diesel at 2 ppm | WCS Oil Affinity | WTI Oil Affinity |
|---|---|---|---|---|---|---|
| n-Butyl Acrylate | 4 | Straight | 14.2 | 0 | 0 | 0 |
| tert-Butyl Acrylate | 4 | Branched | 18.5 | 0 | 1.0 | 0 |
| 2-ethylhexyl Acrylate | 8 | Branched | 11.5 | 12.9 | 4.5 | 1.5 |

As it is shown in the above mentioned example acrylates with alkyl chains larger than 4 provided the greatest amount of drag reduction.

Example 2: Alkyl Methacrylates

The following polymers were emulsion polymerized and tested for their drag reducing properties:

| Alkyl Methacrylate | Carbon Number | Alkyl Chain | Inherent Viscosity | % Drag Reduction in Diesel at 2 ppm | WCS Oil Affin0ity | WTI Oil Affinity |
|---|---|---|---|---|---|---|
| Methyl Methacrylate | 1 | Straight | 14.4 | 0 | 0 | 0 |
| n-Butyl Methacrylate | 4 | Straight | 12.7 | 0 | 1.0 | 0 |
| iso-Butyl Methacrylate | 4 | Branched | 18.7 | 0 | 1.0 | 0 |
| Hexyl Methacrylate | 6 | Straight | 19.5 | 31.9 | 6.5 | 2.0 |
| 2-Ethylhexyl Methacrylate | 8 | Branched | 18.6 | 36.8 | 7.0 | 1.5 |
| Isodecyl Methacrylate | 10 | Branched | 14.3 | 24.8 | 9.5 | 2.0 |

-continued

| Alkyl Methacrylate | Carbon Number | Alkyl Chain | Inherent Viscosity | % Drag Reduction in Diesel at 2 ppm | WCS Oil Affin0ity | WTI Oil Affinity |
|---|---|---|---|---|---|---|
| Lauryl Methacrylate | 12 | Straight | 12.6 | 17.2 | 9.0 | 3.0 |

As it is shown in the above mentioned example acrylates with alkyl chains larger than 4 provided the greatest amount of drag reduction.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process, comprising:
preparing a mixture comprising a first batch of monomers and a second batch of monomers distinct from the first batch of monomers, wherein the first batch of monomers comprises acrylates with side alkyl chains having four or less carbons, methacrylates with side alkyl chains having four or less carbons, or combinations thereof, the second batch of monomers comprises acrylates with side alkyl chains having greater than four carbons, methacrylates with side alkyl chains having greater than four carbons, or combinations thereof, and the second batch is greater than 50% by weight of the mixture; and
polymerizing the mixture to produce an ultra high molecular weight polymer including at least 25,000 repeating units and a weight average molecular weight greater than five million.

2. The process of claim 1, further comprising adding the ultra high molecular weight polymer to a liquid hydrocarbon to produce a treated liquid hydrocarbon.

3. The process of claim 2, wherein a viscosity of the treated liquid hydrocarbon is not less than a viscosity of the liquid hydrocarbon prior to adding the ultra high molecular weight polymer.

4. The process of claim 2, wherein the ultra high molecular weight polymer reduces friction loss associated with a turbulent flow of the liquid hydrocarbon through a pipeline.

5. The process of claim 2, wherein the ultra high molecular weight polymer is added to the liquid hydrocarbon in a range from about 0.1 ppmw to about 500 ppmw.

6. The process of claim 1, wherein the second batch of monomers comprises pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, isooctyl acrylate, isooctyl methacrylate, isodecyl acrylate, isodecyl methacrylate, lauryl acrylate, lauryl methacrylate, 2-ethylhexyl acrylate, 2-ethylhexyl methacrylate, benzyl acrylate, benzyl methacrylate, 2-phenylethyl acrylate, 2-phenylethyl methacrylate, tridecyl acrylate, tridecyl methacrylate, isobornyl acrylate, isobornyl methacrylate, 3,5,5-trimethylehexyl acrylate, 3,5,5-trimethylhexyl methcrylate, 3,3,5-trimethylcyclohexyl acrylate, 3,3,5-trimethylcyclohexyl methacrylate, or combinations thereof.

7. A process, comprising:
preparing a mixture comprising a first batch of monomers and a second batch of monomers, wherein the first batch of monomers comprises acrylates with side alkyl chains having four or less carbons, methacrylates with side alkyl chains having four or less carbons, or combinations thereof, the second batch of monomers comprises acrylates with side alkyl chains having greater than four carbons, methacrylates with side alkyl chains having greater than four carbons, or combinations thereof; and
polymerizing the mixture to produce an ultra high molecular weight polymer including at least 25,000 repeating units and a weight average molecular weight greater than five million.

8. The process of claim 7, further comprising adding the ultra high molecular weight polymer to a liquid hydrocarbon to produce a treated liquid hydrocarbon.

9. The process of claim 8, wherein a viscosity of the treated liquid hydrocarbon is not less than a viscosity of the liquid hydrocarbon prior to adding the ultra high molecular weight polymer.

10. The process of claim 8, wherein the ultra high molecular weight polymer reduces friction loss associated with a turbulent flow of the liquid hydrocarbon through a pipeline.

11. The process of claim 8, wherein the ultra high molecular weight polymer is added to the liquid hydrocarbon in a range from about 0.1 ppmw to about 500 ppmw.

12. The process of claim 7, wherein the second batch of monomers comprises pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, isooctyl acrylate, isooctyl methacrylate, isodecyl acrylate, isodecyl methacrylate, lauryl acrylate, lauryl methacrylate, 2-ethylhexyl acrylate, 2-ethylhexyl methacrylate, benzyl acrylate, benzyl methacrylate, 2-phenylethyl acrylate, 2-phenylethyl methacrylate, tridecyl acrylate, tridecyl methacrylate, isobornyl acrylate, isobornyl methacrylate, 3,5,5-trimethylehexyl acrylate, 3,5,5-trimethylhexyl methcrylate, 3,3,5-trimethylcyclohexyl acrylate, 3,3,5-trimethylcyclohexyl methacrylate, or combinations thereof.

13. A process, comprising:

preparing a mixture comprising a first batch of monomers and a second batch of monomers distinct from the first batch of monomers, wherein the first batch of monomers comprises acrylates with side alkyl chains having four or less carbons, methacrylates with side alkyl chains having four or less carbons, or combinations thereof, the second batch of monomers comprises pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, isooctyl acrylate, isooctyl methacrylate, isodecyl acrylate, isodecyl methacrylate, lauryl acrylate, lauryl methacrylate, 2-ethylhexyl acrylate, 2-ethylhexyl methacrylate, benzyl acrylate, benzyl methacrylate, 2-phenylethyl acrylate, 2-phenylethyl methacrylate, tridecyl acrylate, tridecyl methacrylate, isobornyl acrylate, isobornyl methacrylate, 3,5,5-trimethylehexyl acrylate, 3,5,5-trimethylhexyl methcrylate, 3,3,5-trimethylcyclohexyl acrylate, 3,3,5-trimethylcyclohexyl methacrylate, or combinations thereof; and polymerizing the mixture to produce an ultra high molecular weight polymer including at least 25,000 repeating units and a weight average molecular weight greater than five million.

14. The process of claim 13, further comprising adding the ultra high molecular weight polymer to a liquid hydrocarbon to produce a treated liquid hydrocarbon.

15. The process of claim 14, wherein a viscosity of the treated liquid hydrocarbon is not less than a viscosity of the liquid hydrocarbon prior to adding the ultra high molecular weight polymer.

16. The process of claim 14, wherein the ultra high molecular weight polymer reduces friction loss associated with a turbulent flow of the liquid hydrocarbon through a pipeline.

17. The process of claim 14, wherein the ultra high molecular weight polymer is added to the liquid hydrocarbon in a range from about 0.1 ppmw to about 500 ppmw.

18. The process of claim 13, wherein the polymerizing the mixture comprises emulsion polymerizing the mixture.

19. The process of claim 18, wherein the mixture further comprises a continuous phase, at least one surfactant, and an initiation system.

20. The process of claim 19, wherein the continuous phase comprises water, polar organic liquids, or mixtures thereof.

* * * * *